Feb. 28, 1928.
F. H. WALKLEY
WHEEL
Filed Jan. 22, 1927
1,661,025
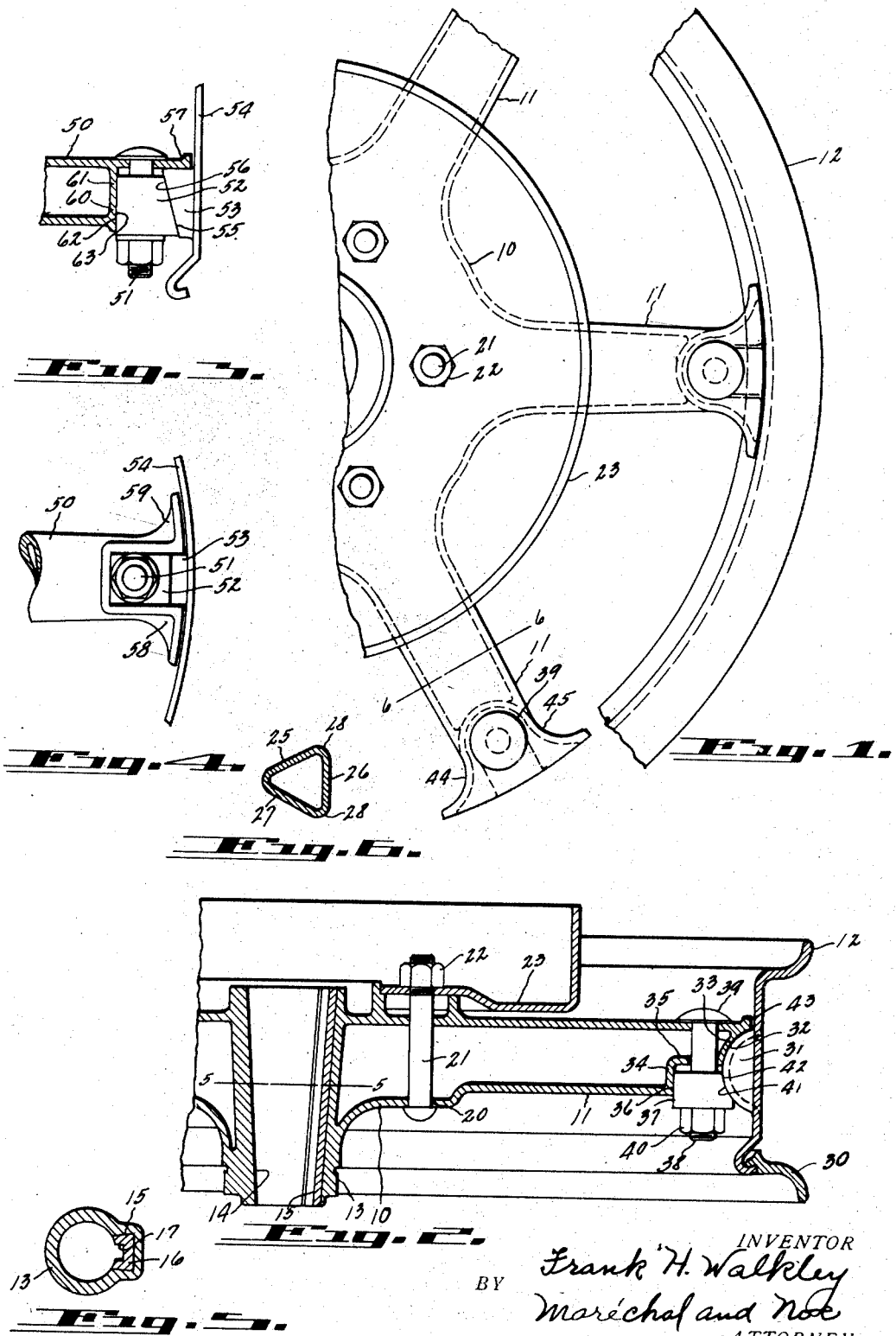
INVENTOR
Frank H. Walkley
BY
Maréchal and Noe
ATTORNEYS Patented Feb. 28, 1928

1,661,025

UNITED STATES PATENT OFFICE.

FRANK H. WALKLEY, OF DAYTON, OHIO, ASSIGNOR TO THE DAYTON MALLEABLE IRON COMPANY, OF DAYTON, OHIO, A CORPORATION OF OHIO.

WHEEL.

Application filed January 22, 1927. Serial No. 162,812.

This invention relates to metal wheels of the character adapted to be used with a tire for supporting a motor vehicle.

One object of the invention is to provide a metal wheel having a metal spoke section the free spoke ends of which are adapted to be detachably fastened to a tire engaging rim section, means being provided to detachably and rigidly clamp the spoke and the rim sections together.

Further objects and advantages of the invention will be more fully set forth in the following description and in the accompanying drawings in which the invention is represented in detail.

In the drawings, Fig. 1 is a fragment of a vehicle wheel shown in elevation;

Fig. 2 is a sectional view taken centrally through one of the spokes of the wheel;

Fig. 3 is a radial sectional view through a modified form of construction of a spoke end;

Fig. 4 is an elevation corresponding to Fig. 3;

Fig. 5 is a transverse section through the central hub portion of the wheel on the line 5—5 of Fig. 2; and Fig. 6 is a sectional line 6—6 through one of the spokes.

Referring more particularly to the drawings by reference numerals in which corresponding numerals designate like parts in the various views, Figs. 1 and 2 represent one form of a vehicle wheel in which the metal spoke section 10 is provided with a number of hollow radially extending spokes 11, the free outer ends of which are adapted to be detachably connected to a rim section designated generally 12 without employing the conventional felloe. This spoke section is constructed preferably as a single integral casting, and the central portion 13 provides a hub which may also be made integral with the spoke section, by which the wheel may be attached to an axle. The casting is preferably made of malleable iron and in order to obtain a good driving connection between the hub section and the axle on which it is mounted this hub section is provided with a tapered bore 14 in which is a large key slot 15. This key slot preferably has opposed inclined sides in the nature of a dove-tail. A steel key section 16 is provided with correspondingly inclined sides, and is firmly held in the key slot. This key section being of hard steel permits the use of a comparatively small key which fits in the key slot 17 provided in the steel key section. Thus the malleable iron of the hub engages with the hard steel section 16 over a comparatively large contact area and a neat and permanent fit of the key and of the key section is insured.

The spoke section 11 is provided with a series of attaching holes 20 through which the bolts 21 extend, the nuts 22 of which firmly mount the brake drum 23 in place on one side of the spoke section. These spoke sections, as shown in Fig. 6, are hollow and are provided with the three sides 25, 26, and 27 which are substantially flat and the ends of which are interconnected by arcuate surfaces 28 of rather small curvature. Such a construction of the spoke section relieves the strain in the metal as the cooling of the casting takes place, since the expansion of any side, being in the direction of the side itself, produces no bending action in the arcuate connections 28 between adjacent sides.

As shown, the wheel is without the conventional felloe, the hollow metal spokes engaging directly with the tire carrying rim section 12. This rim section is adapted to carry a vehicle tire in a desired manner and it may be a single piece or as shown, may be provided with one side 30 which is removable to permit the easy removal of the tire. The rim is provided with a series of rigid wedge projections 31 corresponding in number to the number of spokes. These projections are integrally attached to the main part of the rim, as by being pressed directly out of the rim itself during the construction of the latter. As shown in Figs. 1 and 2 each of these wedge projections is of rectangular cross section, the area of the cross section decreasing progressively from the central portion of the projection to its end. The radial section through the wedge projection as shown in Fig. 2 is of arcuate form to provide a curved sloping wedge surface 32 which is adapted to coact with a groove of corresponding rectangular cross section as indicated at 33 in the end of each of the spokes. This groove 33 extends a very considerable distance along the spoke end and is defined by a surrounding portion of metal on one side of the spoke end. At the opposite side the spoke end terminates a distance from the rim in an abrupt shoulder 34 which provides a flat surface extending directly toward the spoke axis. The shoulder 34 and the metal portions defining the groove are interconnected by a radial metal end section 35 so the outer spoke end is enclosed by these thin metal sections as represented in Fig. 2. The shoulder 34 in the one side of the spoke end is engaged by a flat surface 36 on a separate wedge block 37 through the center of which extends the clamp bolt 38. This clamp bolt extends directly through the spoke end and is positioned outwardly from the shoulder 34. At one end a rounded head 39 of the bolt abuts against one side of the spoke and a nut 40 engaging the threaded shank of the bolt holds the wedge block 37 in place and serves to draw up on the block to cause the rounded outer surface 41 to abut against the correspondingly shaped curved portion 42 of the wedge projection on the rim. When the nut 40 is tightened the rim and the spoke end are urged into clamping engagement by means of the wedge block 37. The two opposing surfaces 36 and 41 of the wedge block are each adapted to engage solidly with the corresponding surfaces of the shoulder 34 and of the rim projection when the rim is fastened tightly on the spoke section.

The side of the spoke end 43 opposite to the side of the spoke on which the shoulder 34 is provided, together with the adjacent portions 44 and 45 of the spoke end are provided with a cylindrically shaped surface which conforms to the inner rim surface from which it is spaced a small clearance distance sufficient to permit the easy alignment of the rim projections and spoke ends when the rim is first applied to the spoke section. When the attachment bolts are tightened and the separate wedge blocks 37 are urged into their proper places, the rim section will be held firmly in place against any axial movement, and located exactly in a predetermined relationship with the spoke ends. The driving force of the spoke section on the rim will be applied through the parallel sides of the groove to the spoke ends, it being understood that the groove width is just sufficient to conveniently permit the insertion of the rim projections without obtaining any binding action on the side surfaces of the groove.

In Figs. 3 and 4 a modified form of the invention is shown in which the radially extending spokes 50 are each provided with an attaching bolt 51 mounted in the end of the spoke, by which the separate wedge block 52 is urged into clamping engagement with the wedge shaped projection 53 integrally provided on the rim 54. The wedge projection 53 of the rim and the inner portions of the spoke section may be constructed in the same manner as fully set forth in regard to the form of construction represented by Figs. 1 and 2. These wedge projections 53 are of rectangular cross section and are provided with an inner flat wedge surface 55; the cross sectional area progressively and regularly decreases from the larger end of the wedge to the opposite end and the wedge block 52 is provided with a corresponding inclined wedge surface 56 which lies flat against the surface 55 of the rim projection in the normal tightened position of the rim. One side of the spoke end as at 57 is continuous substantially out to the rim and this side 57 together with the adjacent portions 58 and 59 of the spoke end provides a cylindrical curved surface spaced a slight distance from and conforming to the curvature of the inner side of the rim. The spoke terminates on the side opposite the extended portion 57 some distance from the rim in a shoulder 60 which extends a considerable distance directly toward the spoke axis. A groove defining section of metal 61 closes the spoke end and a flat abutment surface 62 is provided, against which the corresponding engagement surface 63 of the wedge block 52 fits. The rectangular groove in the spoke end extends nearly the full width of the spoke in the form shown in Figs. 3 and 4 and terminates at the end wall 57 of the extended spoke side. This extended spoke side abuts as shown against the end of the wedge projection of the rim against which it is held by the action of the wedge block 52 and the clamp bolt.

By means of the construction as set forth the spoke section may be held firmly in engagement with the corresponding portions of the rim section, each spoke end being clamped firmly in a predetermined position and relationship on the wedge projection of the rim. Undue strains are not applied to the various metal portions of the wheel, and the manner in which the wedge blocks cooperate with the spoke ends and with the rim prevents the rim or the spokes from being forced out of their natural positions.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A wheel comprising a plurality of hollow metal spokes having disconnected outer ends adapted to receive a tire carrying rim, each spoke end being provided with a groove of rectangular cross section extending at least part way across the spoke end for receiving a projection on the rim, said spoke end providing an end surface cylindrically curved to conform to the inner surface of the rim, means extending through each spoke end, and additional means cooperating therewith for urging the spoke end into clamping engagement with the rim projection.

2. A wheel comprising a plurality of hollow metal spokes having disconnected outer ends adapted to receive a tire carrying rim, each spoke end being provided with a groove of rectangular cross section for receiving a projection on the rim, and means carried by each spoke end for urging the spoke end into clamping engagement with the rim projection, said means comprising a clamp bolt and a separate wedge block between the rim projection and one side of each spoke end, said wedge block providing a flat surface parallel to the bolt axis for engaging a corresponding flat surface on the spoke end.

3. A wheel comprising a plurality of hollow metal spokes having disconnected outer ends adapted to receive a tire carrying rim, each spoke end being provided with a groove for receiving a projection on the rim, one side of said spoke end terminating at a distance from the rim to provide an abrupt shoulder extending a substantial distance toward the spoke axis, and means for urging each spoke end into clamping engagement with the rim projection, said means comprising a separate wedge block adapted to engage solidly against surfaces on the rim projection and the spoke, the other side of said spoke end and the portions of the spoke end adjacent said other side being extended substantially to the rim and providing a surface conforming to the inner rim surface, and a clamping bolt extending through the spoke end and said block.

4. In a vehicle wheel, in combination, a spoke section having a number of radial hollow metal spokes, a tire engaging rim section, and a readily detachable means connecting the outer end of each spoke to the rim section, comprising a plurality of wedge shaped projections integral with the rim section, the spoke ends each providing a substantially cylindrical surface conforming to the inner surface of the rim section, each spoke end having a groove for receiving a wedge projection of the rim, a fastening bolt extending directly through each spoke end, and a wedge block engageable with the wedge projection on the rim section and cooperating with said bolt in effecting a clamping action of each spoke end with the rim, said spoke end and said block having flat surfaces substantially parallel to the bolt axis adapted to engage with a surface contact in the various positions of the wedge block.

In testimony whereof I hereto affix my signature.

FRANK H. WALKLEY.